United States Patent [19]
De Simon

[11] Patent Number: 5,325,708
[45] Date of Patent: Jul. 5, 1994

[54] DETECTOR FOR HELIUM LEAKS

[75] Inventor: Mauro De Simon, Osoppo, Italy

[73] Assignee: Varian S.p.A., Turin, Italy

[21] Appl. No.: 934,176

[22] Filed: Aug. 21, 1992

[30] Foreign Application Priority Data

May 14, 1992 [IT] Italy .................... TO92A000416

[51] Int. Cl.⁵ .................................. G01M 3/04
[52] U.S. Cl. .................................. 73/40.7; 73/23.2
[58] Field of Search .................. 73/40.7, 23.2

[56] References Cited
U.S. PATENT DOCUMENTS

| | | | |
|---|---|---|---|
| 3,803,900 | 4/1974 | Maillard | 73/40.7 |
| 4,111,554 | 9/1978 | Colin et al. | 73/23.35 |
| 4,492,110 | 1/1985 | Bergquist | 73/40.7 |
| 5,019,517 | 5/1991 | Coulson | 73/23.2 |
| 5,134,877 | 8/1992 | Gilles et al. | 73/40.7 |

FOREIGN PATENT DOCUMENTS

| | | |
|---|---|---|
| 0352371 | 7/1992 | European Pat. Off. . |
| 1179600 | 3/1984 | Italy . |
| 1224604 | 7/1988 | Italy . |

Primary Examiner—Hezron E. Williams
Assistant Examiner—Helen C. Kwok
Attorney, Agent, or Firm—James D. Hall

[57] ABSTRACT

The present invention relates to an improved helium detecting unit particularly adapted to be used under difficult conditions and in places without power supply sources, which comprises an electronic processing stage [means] [implementing the task of] for calculating the helium concentration in the gas mixture to be sampled and an electronic controlling stage [means] for controlling the detecting unit, and wherein there is provided a sampling chamber, coated with a reflecting material and provided with a gap, mounting a sinterized filtering member adapted for cooling the sampled gas flow coming out of a sucking sampling pump equipped with a filter against the impurities.

16 Claims, 6 Drawing Sheets

DETECTOR FOR HELIUM LEAKS

BACKGROUND OF THE INVENTION

The present invention relates to an improved helium detecting unit of the kind employed when searching for leaks in ducts and chambers located in places that are particularly difficult to be accessed and spread over an extended range, far from power supply sources.

For detecting leaks in ducts and chambers of various type and shapes, such as for example the underground pressurized ducts housing telephone cables, there are presently employed techniques using units capable of detecting the concentration of a gas which has been put into the duct the integrity of which has to be tested, and leaks out through cracks that may be present in the duct and can therefore be captured by the detecting unit located outside.

Such units can detect a change in the concentration of a single gas in the gas mixture usually composing the air at ground level, and allow for discovering leaks, if any, due to conduit breaking or cracks with a good accuracy both in respect of the leak location and of the amount thereof.

Units of the above described kind, using helium as a tracing gas, have been disclosed in Italian patents No.s 1 179 600 and 1 224 604 and in EP-A-0352371 in the name of the present Assignee.

The above and other similar devices are equipped with a chamber which is preferably cylindrical, within which a thin quartz capillary is located, being well known that quartz is permeable to helium only when heated to a temperature comprised between 300° and 900° C., wherein one end of the capillary is closed and the opposite end is open and connected to the suction inlet of a UHV (Ultra High Vacuum) pump.

In EP-A-0352371 there is disclosed a helium detector comprising an ion pump and a sniffer probe formed by one or more capillary tubes of silica glass that are closed at one end and connected to the ion pump at the opposite end. A heating filament wound about the capillary tube heats the capillary to a temperature of about 750° C. at which temperature the silica glass becomes permeable substantially to helium only. The ion current drawn by the pump is representative of the helium concentration in the gas mixture to be sampled.

Suitable electronic control systems take care of stopping the heating of the filament when high concentrations of helium are present in order to prevent such gas accumulating within the capillary with a consequent delay of the response to changes of helium concentration in the gas mixture to be analyzed.

The above described devices show anyhow some significant short comings when the units are to be used for checking the condition of ducts or chambers that are located in positions hard to be accessed, such as when they are buried under roadbeds and in sections that are quite long.

In the first mentioned case the weight of the conventional units as well as their construction which is not suitable for an efficient working in presence of dust, mould and other external agents, are an obstacle to the good operativeness of the apparatuses, tire the operator and are subject to frequent clogging with a consequent worsening of the performance.

In the second mentioned case since it is necessary to work over long distances and far from mains power supply sources, auxiliary mobile supply units are to be provided for.

A further shortcoming of the above mentioned units resides in that they have been found subject to an internal overheating after an uninterrupted and prolonged use, particularly in the junction zone between the capillary membrane and the flange provided on the suction inlet of the ion pump, this resulting in a detachment of the UHV (Ultra High Vacuum) seal between the capillary and the flange, thus rendering the detecting unit unserviceable.

A further shortcoming is due to the fact that the above described sensing systems exhibit a large inertia of response when passing from a low helium concentration zone to a high helium concentration zone and vice versa, thus rendering the detection slow and unaccurated.

Finally due to the absence of control devices in the above apparatuses, it may happen that apparatuses that are inoperative or not properly working are employed without the operator's knowledge.

SUMMARY OF THE INVENTION

The object of the present invention is that of providing an improved unit for detecting helium leaks which is very reliable and accurate, adapted to be used under particularly difficult conditions, that has a good service autonomy and is easy to be handled and used.

An additional object of the present invention is that of providing a unit of the above mentioned type allowing long periods of operativeness between the maintenance and servicing interventions, and is capable of a prolonged and uninterrupted use.

The above as well as additional objects are achieved by imparting to the device of the invention the characteristics recited in the attached claims.

Additional characteristics and advantages of the invention will be better understood from the description of a preferred but not exclusive embodiment of the unit which is illustrated as a non limiting example in the attached drawings.

DESCRIPTION OF A PREFERRED EMBODIMENT

Figure 1:
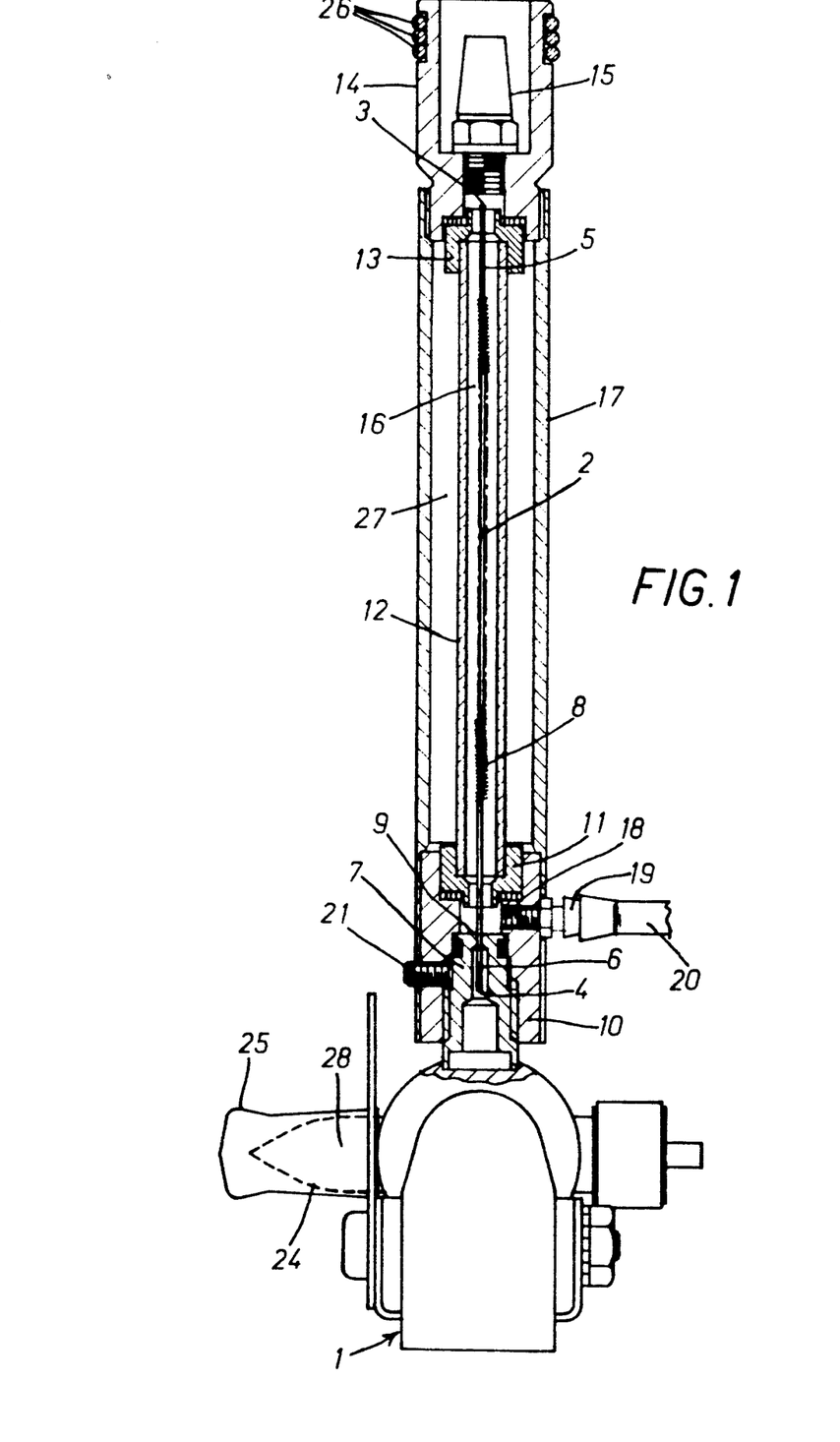
FIG. 1 is a cross-section partial side view of the unit.

With reference to FIG. 1, the unit of the invention comprises a quartz capillary membrane 2 having a circular cross-section area of about 1 $cm^2$ with a closed end 3 and an open end 4. Around the middle area of this capillary membrane 2 a platinum filament 8 is wound for about ⅔ of the length thereof leaving a free portion 5 towards the closed end 3 and a free portion 6 towards the open end 4, such filament being adapted to heat the capillary membrane 2 by contact when an electric current flows in the filament.

Portion 6 of the capillary membrane 2 partially protrudes through a hole into a flange 7 provided at the suction inlet of an ion pump 1.

An UHV (Ultra High Vacuum) seal 9 is fixed by an epoxy resin between a hole in a connecting flange 7 and the outer surface of the portion 6 of the capillary membrane 2.

Outside the connecting flange 7 there is provided a first cylindrical hollow member 10 formed by a semi-rigid plastic material with thermal insulating characteristics, within which at one end the connection flange 7 is partially fitted and at the other end a first cylindrical drilled support 11 is fitted which is adapted to retain one end of a quartz cylindrical tube 12. The opposite end of tube 12 is retained in a similar manner within a second cylindrical drilled support 13 which in turn is partially fitted into a second cylindrical drilled member 14 of a plastic material having thermal insulating characteristics.

A sintered filter 15 is housed within said second cylindrical drilled member 14, which is adapted to cool the gas flow passing from the chamber 16 defined by the inside of the cylindrical tube 12 towards the outside.

This way the gas reaches a temperature of about 150° at a distance of 1 cm from the filter 15. The filter 15 further acts as a flame barrier in case the gas to be sampled is inflammable.

The inner surface of the quartz tube 12 is coated by a reflecting film of aluminum or alternatively it is treated with a glass aluminizing process in order to reduce the loss of heat due to radiation from the filament and the capillary membrane.

Elastic rings 26 are further provided ouside the cylindrical member 14 in order to damp the vibrations of the unit in respect of a possible housing (not shown).

In order to protect the cylindrical tube 12 and to create a gap 27 for thermally insulating the chamber 16, there is provided a tubular housing 17 of stainless steel which is fitted at one end to the first cylindrical member 10 and at the other end to the second cylindrical member 14.

The housing 17 is further provided with a side hole 18 passing through the cylindrical member 10 too and drilled in correspondence of the free portion of said cylindrical member 10 which is comprised between the portion fitted with the flange 7 and the portion fitted with the cylindrical support 11, into which hole is press fitted a sleeve 19 connected to a flexible duct 20 from an auxiliary sampling pump 29 for pumping the air sucked from the outer environment and to convey it into the chamber 16 through the duct 20, the sleeve 19 and the hole 18.

The above construction is quite different from that of the prior devices wherein the sampling pump takes the sampled gas from the chamber containing the capillary membrane, with the gas passing then into the high temperature sampling pump.

According to the present invention since the flow of the incoming gas to be sampled is directed towards the glued zone between the membrane 2 and the flange 7, it allows for the cooling of the glued zone and prevents the melting of the UHV seal.

There is provided a set screw 21 passing through both the wall of the housing 17 and the first cylindrical hollow member 10 for pressing against the connection flange 7 in order to maintain in position the flange 7 and allowing for the extraction of the flange 7 for inspecting the capillary membrane 2.

The free ends of the heating filament 8 are connected to the ends of the electric connections 22 and 23 coming from a feeding unit and retained in the first and second drilled support 11 and 13 respectively.

A recess 28 is provided on a side of the above mentioned ion pump 1 and contains a pellet of a Zr/V/Fe alloy, a material adapted for absorbing gases that do not belong to the group of the noble gases, particularly hydrogen, that may be present in the capillary membrane, this device being known in the art as a chemical pump or a "getter".

Such gases other than helium constitute the background noise when the unit evaluates the helium concentration and according to the present embodiment they are removed by a static device such as a chemical pump, so that a high accuracy of the measurement can be achieved while keeping the temperature of the capillary membrane relatively low, typically 550° C., thus allowing for a considerable power saving of the unit.

The edge 24 of such recess 28 is folded and welded during the assembly and is protected by a cap 25 of soft plastics to prevent the operator being hurt during the assembly and the subsequent inspection of the unit.

Figure 2:
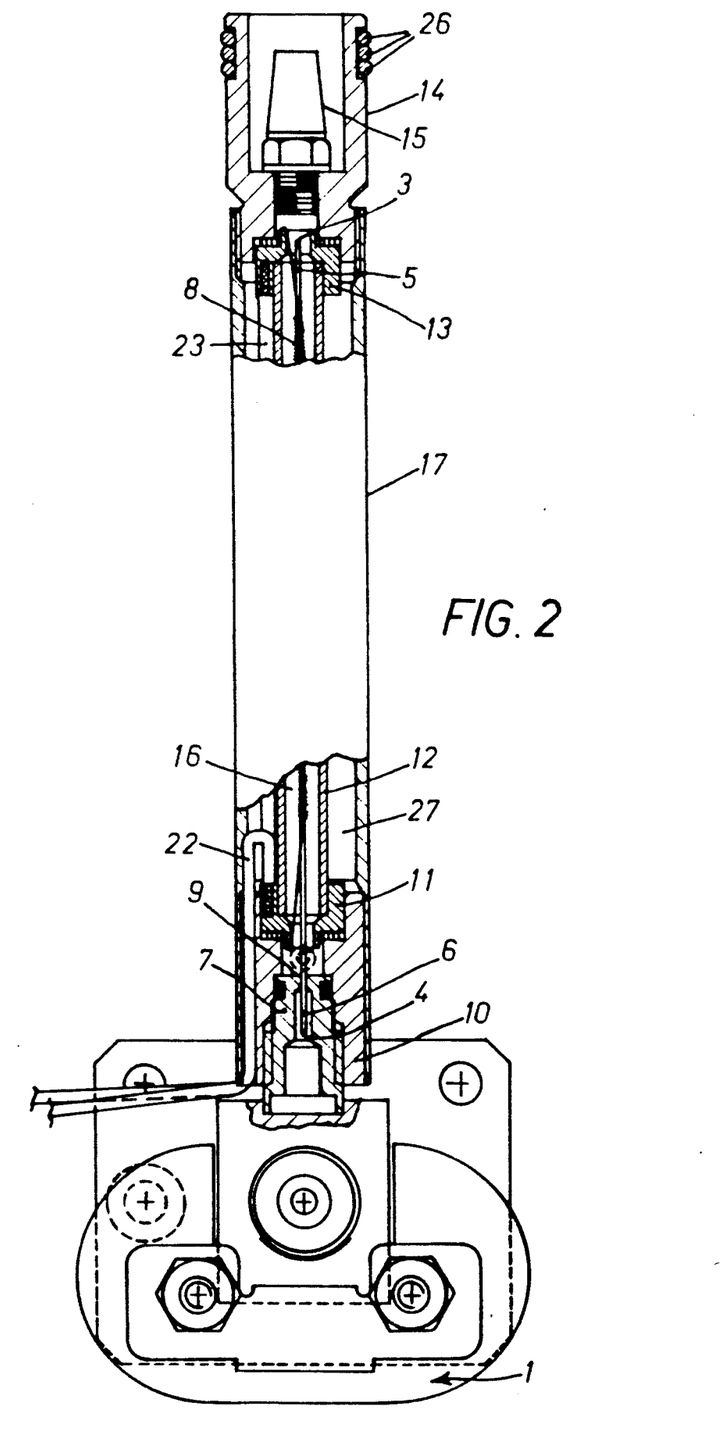
FIG. 2 is a cross-section partial front view of the unit.
Figure 3:
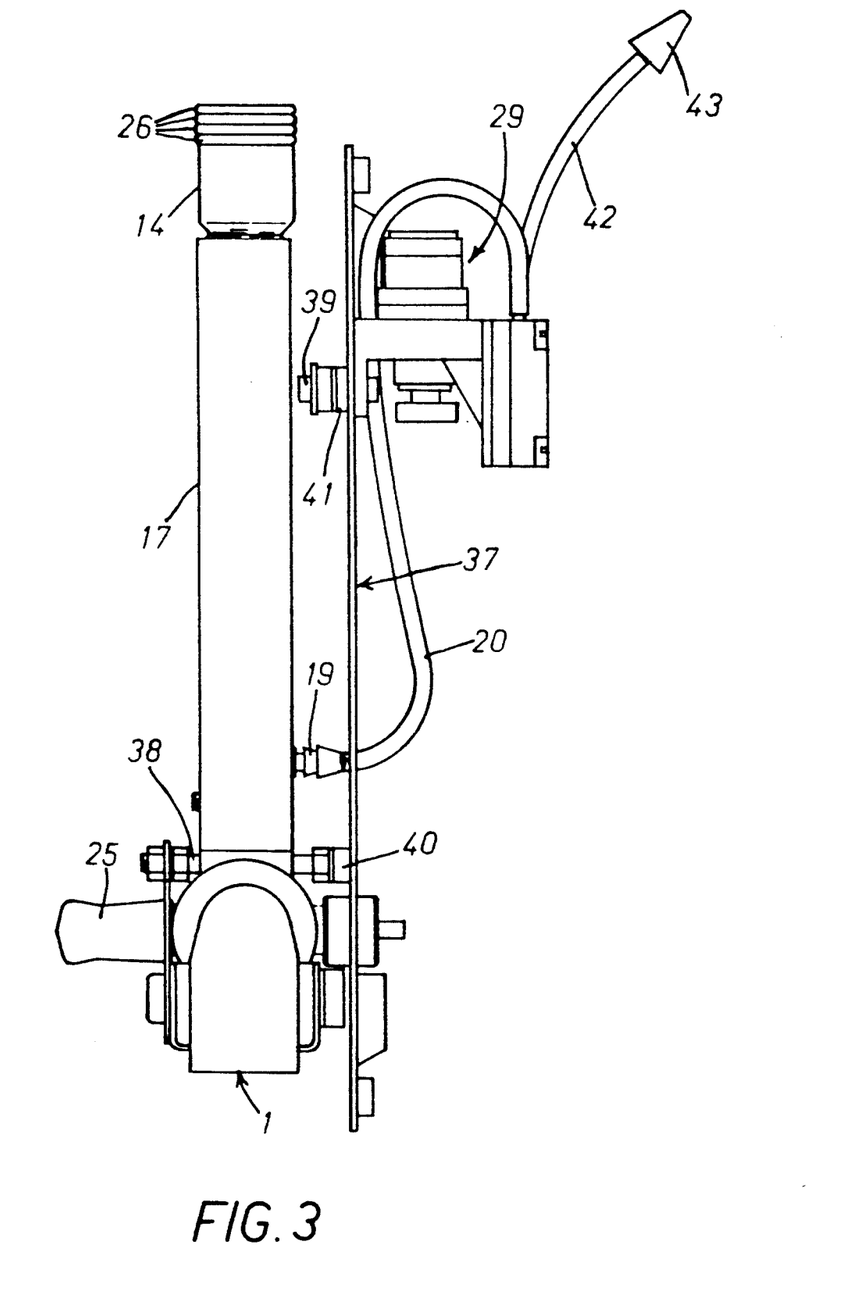
FIG. 3 is a side view of the unit.

The ion pump 1 and the sampling pump 29 are mounted on opposite faces of a flat metal member or plate 37 through screws 38 and 39 with elastic members 40 and 41 being interposed therebetween. At the inlet of the sampling pump 29 there is inserted a suction duct 42 having at its free end a filter 43 for stopping impurities.

Moreover the filter 43 acts as a flame barrier like the already discussed filter 15, in case the gas to be sampled is inflammable.

The unit of the present invention further comprises electronic signal processing means that controls the functions or tasks carried out by the above illustrated components and supplies information about the working condition of the unit, as well as about the presence of helium in the gas mixture under examination and about the amount of such concentration.

Figure 4:
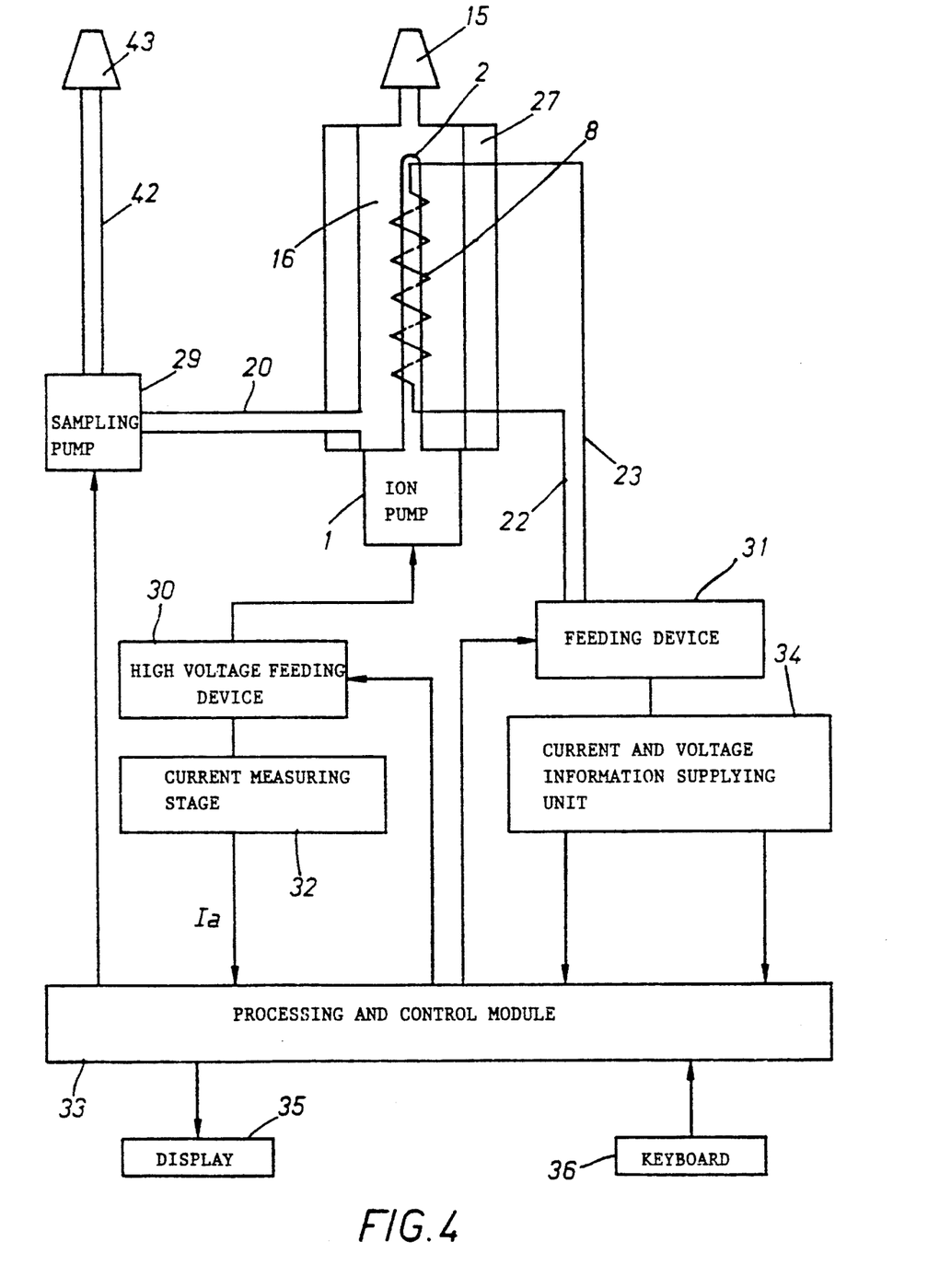
FIG. 4 is a block diagram of the mechanical and electronic parts forming the unit.

Referring now to FIG. 4, the unit of the present invention comprise a device 30 for feeding a high voltage to the ion pump 1, with a current measuring stage 32 for measuring the current drawn, such measuring stage supplying an output signal $I_a$ to the processing and control module 33.

Such feeding device 30 can supply the ion pump with a voltage that can be switched from a steady state current of 3,000 V and a trigger voltage of 6,000 V.

Still with reference to FIG. 4, for completeness there are schematically shown a sampling pump 29 equipped with an inlet filter 43 and a suction duct 42, a duct 20 connecting the sampling pump 29 with the sampling chamber 16, provided with a gap 27 and a sintered filter 15 housing the capillary membrane 2 about which there is wound the heating filament 8 fed through the connections 22 and 23 of the feeding unit 31.

A stage 34 is further provided for supplying to the processing and control module 33 information concerning the current flowing in and the voltage across the filament 8 immediately after the feeding phase thereof carried out by a pulsating current supplied by the module 31 feeding the filament 8.

An 8 bit microprocessor and four summing circuits are used for processing the signal $I_a$ from the measurement stage 32. The signal $I_a$ is simultaneously applied to the analog input of the 8 bit microprocessor and to the analog input of the four summing circuits.

Depending on the entering current level, a proportional output signal is generated by the four summing circuits and applied thereafter to four different analog inputs of the microprocessor in accordance with the following relationship:

$$Out_i = K(I_a - 50_0 i)$$

where $0 \leq i \leq 3$ and $K = 5$ V/60 nA

Figure 7:
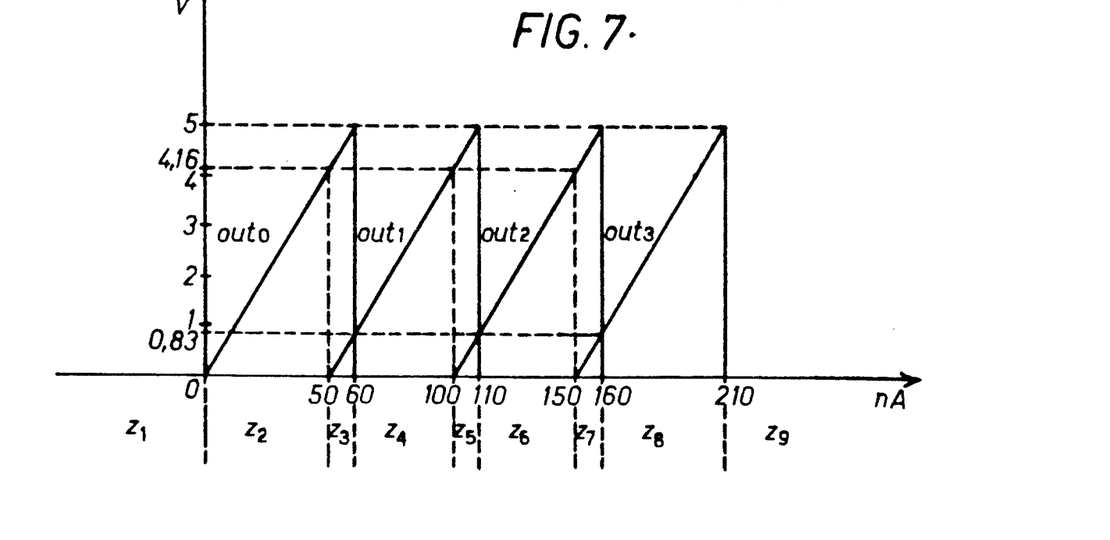
FIG. 7 is a graph illustrating the output signals of the summing modules.

The voltage of the signals $Out_0 \ldots Out_3$, will be proportional to the level of the current drawn by the ion pump and therefore to the helium concentration within the capillary membrane, and is shown in FIG. 7.

The level of the represented signals allows for defining nine evaluation bands or zones of the ion current level, each one excluding the others, shown in FIG. 7 with the references $Z_1 \ldots Z_9$.

Such bands are discriminated into four groups by the 8 bit microprocessor according to the following criteria:

if the level of the output $Out_0$ is lower or equal to zero, band $Z_1$, then the microprocessor sets $I_c = 0$;

if the level of the output $Out_3$ is higher than 5 V, which means a current level $I_a > 210$ nA, band $Z_9$, then the microprocessor sets $I_c = I_a$;

if both conditions 0 V $< Out_i < 5$ V and 0 V $< Out_{i+1} < 5$ V with $0 \leq i \leq 2$, bands $Z_3$, or $Z_5$ or $Z_7$, then the current is calculated as the mean value of the current values in accordance with the following equation:

$$I = \frac{1}{2} \sum_{j=i}^{i+1} \left( \frac{Out_j}{K} + 50 \cdot j \right)$$

if 0.83 V $< out_1 < 4.16$ V, bands $z_2$, $Z_4$, $Z_6$ and $Z_8$, then the current is calculated in accordance with the equation $I = (Out_1/K + 50 \cdot i)$. Under these conditions the current signal I, is divided in the range 0-200 nA into four current levels further processed by the 8 bit microprocessor thereby achieving a resolution better than 0.25 nA when the current drawn by the ion pump is in the range from 0 to 200 nA, and a resolution of 10 nA over the whole working range which is typically from 0 to 2 μA.

In presence of helium the temperature of the capillary has to be reduced to prevent the saturation of the sampling chamber with a consequent response delay when passing from a high helium concentration zone to a zone devoid of helium.

To this aim there has been provided a module for evaluating the capillary temperature that uses the temperature information of the heating filament wound about it, calculated on the basis of the current and the voltage of the filament in a phase immediately subsequent to the phase of pulsating feeding. In other words a stage 31 for feeding pulses to the filament 8 through the connections 22 and 23, supplies a pulsating voltage that raises the temperature of filament 8 to a temperature $t_x$. The immediately subsequent measurements of the voltage and the current of the filament provide an indication of its temperature in accordance with the following relationship:

$$t_x = (1/Q) \cdot (R_t/R_o - 1 + t_o)$$

where $R_t$ is the filament resistance at the temperature $t_x$ expressed as the ratio of the voltage to the current according to Ohm' law; whereas $R_o$ is the known filament resistance at the temperature $t_o$, and Q is the proportionality constant of the material used for making the filament.

The duration of the pulsating voltage applied to the filament 8 is changed as a function of the measured current $I_c$ drawn by the ion pump, in accordance with an optimized criterion for keeping it lower or equal to a predetermined steady state value $I_{reg}$. In case the current drawn by the ion pump tends to increase due to an increase of the helium concentration and exceeds the predetermined threshold $I_{reg}$, or in case the change of such current exceeds the threshold $I_{der}$, then the duration of the voltage pulse applied to the filament is shortened allowing the capillary to cool, that is to become less permeable to helium and therefore to allow the capillary to be emptied by the pump and be brought back to levels of the drawn current that are equal or lower than those of the steady state $I_{reg}$.

A maximum temperature threshold $T_{max}$ is provided for in order not to exceed the critical heating levels when the helium concentration is quite low and the current drawn by the ion pump does not reach the steady state level $I_{reg}$.

The helium concentration is calculated according to the following relationship:

$$He = S \cdot \left( I - I_0 + \Gamma \cdot \frac{dI_c}{dt} \right) \cdot \frac{1}{T} \cdot \exp\left( \frac{E_0}{T} \right);$$

that takes into account the geometry of the capillary, the constant S, the volume and the pumping rate of the ion pump, the constant $\Gamma$ which depends upon the volume of the capillary membrane and the pumping rate of the ion pump, the bottom current $I_0$ and the quartz permeability to helium, i.e. the term $$\frac{1}{T} \cdot \exp\left( \frac{E_0}{T} \right)$$

In case the helium bottom concentration changes due to a change of the air conditions in the operating environment, the new bottom current level can be stored, and the unit will either be operated in a "fixed zero" manner or let it be automatically calculated operating in an "automatic zero" condition with an integration time of about 10 seconds.

Figure 5:
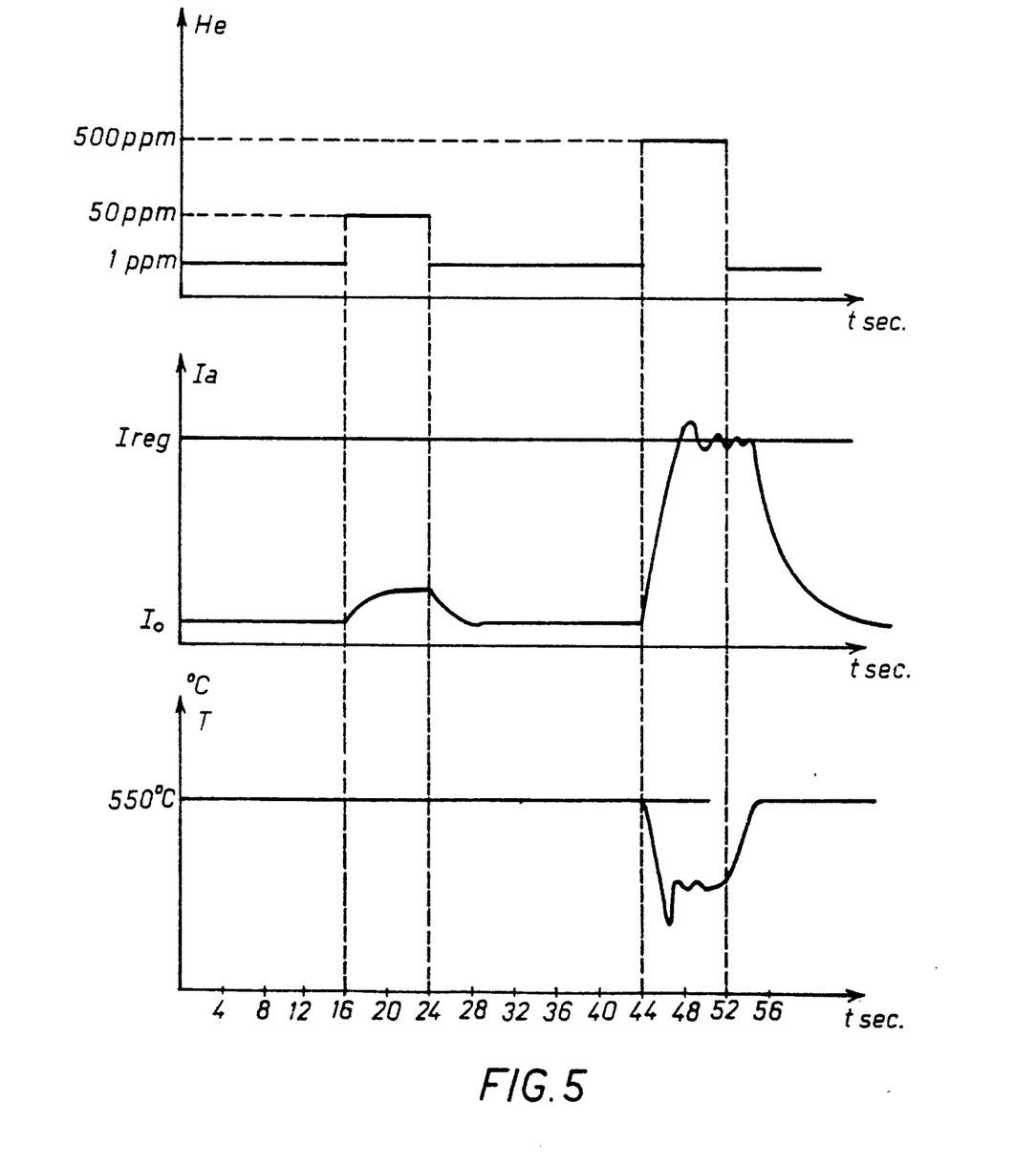
FIG. 5 is a graph illustrating the characteristic quantities versus the helium concentration.

With reference to FIG. 5, there are shown in the current $I_a$ and the temperature T of the filament versus the helium concentration of the air to be sampled. For modest changes of the helium concentration, that is about 50 ppm, the filament temperature does not undergo changes since the slope of the ion current, and therefore the derivative thereof, is below the threshold for deenergizing the filament heating. For large changes, that is about 500 ppm, the filament temperature decreases since the ion current exceedes both thresholds, on the derivative and on the level $I_{reg}$, bringing again the ion current to steady state values.

For speeding up the depletion phase of the quartz capillary when this latter is saturated with helium, an additional control of the current drawn by the pump has been introduced allowing this current to reach a value of 1 μA before the filament temperature is raised again.

This way the depletion speed of the ion pump becomes ten times larger than that of the normal working conditions with a quicker removal of the accumulated helium.

To prevent the unit from being employed when its working would not be the optimum due to a clogging caused by dust or other external agents, there is provided a cycle for controlling the proper working of the inflow channel of the gas to be sampled, which is automatically actuated at each triggering of the sampling pump. This control cycle compares the power $P_0$ drawn by the pump when the sampling pump is deenergized with the power $P_1$ drawn when the pump has been triggered. When the two power values $P_0$ and $P_1$ are equal, or in case power $P_1$ is lower than $P_0$, a fault situation is shown on the display 35 and the operator is warned accordingly.

A module 33 for starting and checking the pump triggering is provided for ensuring a correct working of the pump even in conditions that are particularly unfavourable for the triggering thereof, typically when the pressure is below 1E-9 mbar.

Figure 6:
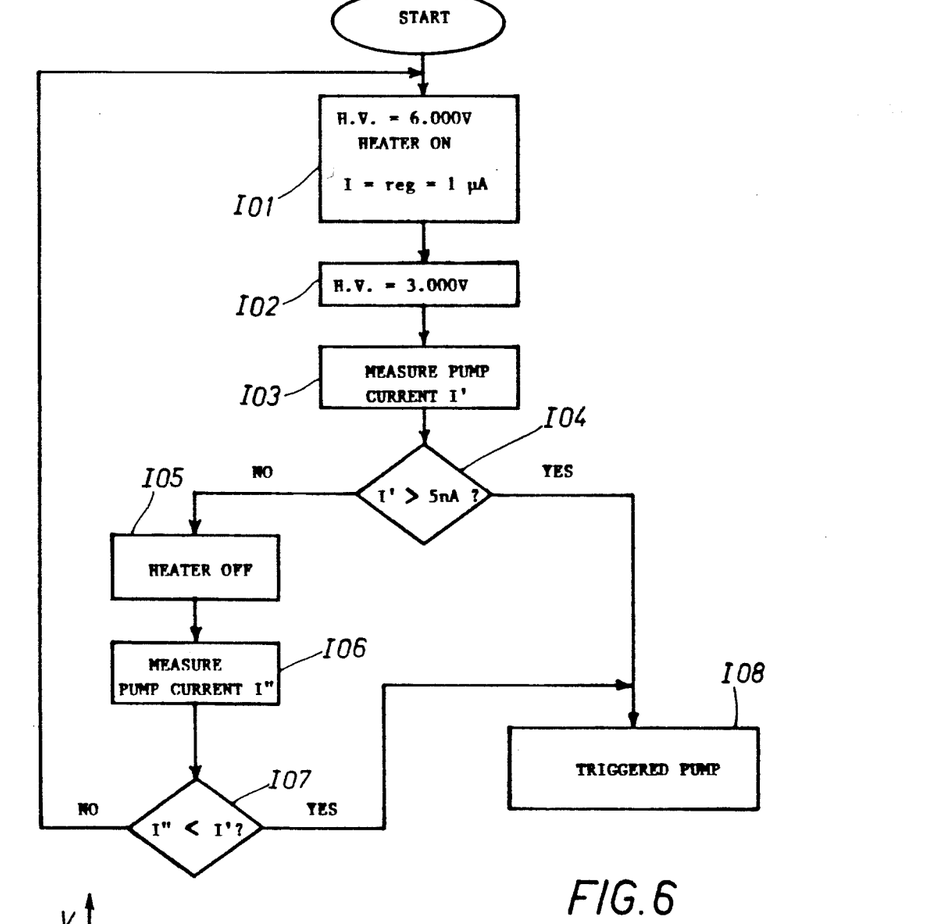
FIG. 6 is a diagram illustrating the flow of the operations for starting the ion pump.

With reference to FIG. 6 such triggering module comprises a phase 101 starting the pump at 6,000 V for about 10 seconds. During this phase 101 the heater of the capillary membrane is energized and the maximum threshold $I_{reg}$ of the current drawn by the ion pump is maintained at 1 μA. In the second phase 102 of such cycle the pump working voltage is lowered to 3,000 V and consequently the current I' drawn by the ion pump is reduced. Then in a third phase 103 the pump working voltage is measured. Then phase 104 provides for a comparison phase in which the pump will surely be triggered if the measured current I' is larger than 5 nA which is the maximum dispersion current (equivalent to the current drawn by the ion pump when the inside pressure is zero) drawn by the ion pump at 3,000 V. In case such current I' is smaller than 5 nA, a further control will be executed by switching off the heater for about 4 seconds, phase 105, and measuring againg the current I'' drawn by the ion pump, phase 106. In case after such comparison, phase 107, the current I'' is smaller than the previous current I', the ion pump will be triggered, otherwise the triggering cycle will be activated again for a further attempt.

The affirmative outputs of phases 107 and 104 are followed by phase 108 that activates the working cycle of the unit.

With the above illustrated embodiment it was possible to detect helium concentrations in the air comprised between 1 ppm and 1E+6 ppm with a response time of about 2 seconds at a temperature of the capillary of about 550° and with a drawn power of about 10 W.

I claim:

1. An improved unit for detecting helium leaks comprising a cylindrical tube, internally coated by a reflecting material, concentrically located inside a cylindrical housing and defining a first sampling chamber between the inner surface of the cylindrical tube and the outer surface of a capillary membrane, as well as a second thermally insulating chamber between the outer surface of the cylindrical tube and the inner surface of the housing, said first chamber being equipped with a sintered filter with an extended surface and adapted to cool the gas flow exiting from the chamber and directed towards the outside environment, and such as to form a flame barrier; a free portion of said capillary membrane partially protruding through into a flange provided at the suction inlet of an ion pump; said unit further comprising:

means for transforming a signal $I_a$ that is proportional to the current drawn by the ion pump into n signals $Out_i, \ldots Out_a$ the voltage of which is proportional to the current of the signal $I_a$, said signals being activated one after the other when signal $I_a$ subsequently reaches n current thresholds, and being deactivated when signal $I_a$ subsequently reaches as many current thresholds;

means for evaluating the level of the current drawn by the ion pump;

means for selecting said means for evaluating the level of the current drawn by the ion pump on the basis of the voltage level reached by the n signals $Out_i, \ldots Out_a$ from said means for transforming the signal $I_a$;

means for calculating the value He of the helium concentration in a gas mixture contained in the sampling chamber on the basis of the evaluated value $I_c$ of the current drawn by the ion pump, on the basis of the value T of the temperature of the capillary membrane, on the basis of the level $I_o$ of the bottom current drawn by the ion pump, on the basis of the permeability of quartz to helium, exponential term, and on the basis of the time constant Γ of the system that depends upon the volume of the capillary membrane and the pumping rate of the ion pump, according to the following relationship:

$$He = S \cdot \left( I - I_0 + \Gamma \cdot \frac{dI_c}{dt} \right) \cdot \frac{1}{T} \cdot \exp\left( \frac{E_0}{T} \right);$$

two stages, a pulsating feeding stage and a sampling stage respectively, adapted to cyclically switch from a phase in which the first stage that pulsatingly feeds the heater filament of the capillary membrane is activated to a phase in which the second stage which measures the voltage and current values of the filament is activated, said voltage and current values being used by a subsequent processing stage for calculating the filament temperature;

a stage for processing the value $t_x$ of the capillary membrane temperature in which the filament voltage value $V_f$ and current value $I_f$ are combined with the temperature value $t_o$ and the resistance value $R_o$ at known conditions in accordance with the following law:

$$t_x = \frac{1}{Q} \cdot \left( \frac{V_f}{I_f \cdot R_0} - 1 \right) + t_0$$

where

Q is the proportionality constant of the material used for making the filament;

a stage for a timed raising of the threshold of the maximum admissible current drawn by the ion pump, adapted to increase the depletion speed of the ion pump that becomes 10 times greater than that of the normal working conditions, thus allowing for a quicker removal of the helium accumulated;

a stage for measuring and comparing the power drawn by the ion pump both in presence and without the flow of gas from the sampling pump;

a check-trigger stage for the ion pump adapted to check that the triggering of the ion pump has taken place.

2. A unit as claimed in claim 1 wherein the flow of the gas to be sampled is sucked by a sampling pump that directs it into the chamber through a hole located at the bonding area between the capillary membrane and the flange of the suction inlet of the pump, said flow circulating through the chamber before exiting from the opposite end of the pump through a filter.

3. A unit as claimed in claim 1 wherein the ends of said cylindrical tube are fitted within drilled cylindrical members of a semirigid plastic material having a hole with a diameter decreasing towards the end opposite to that in which the cylindrical tube is fitted in order to accomodate the lateral movements of the capillary membrane, typically flexible, in case the unit is being shaken.

4. A unit as claimed in claim 1 wherein the ion pump is provided with a side recess communicating with the inner chamber of the ion pump within said recess is a pellet of a Zr/V/Fe alloy known as chemical pump or "getter" being located which is adapted to absorb gases different from the noble gases, said recess being closed during the assembly by welding the edges of the tubular channel communicating the recess with the outside, and being covered by a protective cap of plastic material.

5. A unit as claimed in claim 1 wherein the heating filament is wound onto the quartz capillary membrane for about ¾ of its length while leaving uncovered two portions at the ends of said capillary, the first portion being the UHV (Ultra High Vacuum) bonding area and the second portion being located near the outlet of the sampled gas.

6. A unit as claimed in claim 1 wherein said ion pump and said sampling pump are mounted on a common rigid support with elastic members interposed therebetween and adapted to damp the vibrations imparted to the common rigid support, said sampling pump being further provided with a suction tube equipped with a filter for impurities and further adapted to realize a flame barrier.

7. A unit as claimed in claim 1 wherein the pulse duration of said pulsating feeding stage is decreased when the current drawn by the ion pump exceeds the threshold $I_{reg}$ or when the derivative of said drawn current exceeds the threshold $I_{der}$.

8. A unit as claimed in claim 1 wherein said reflecting material on the inner surface of the cylindrical tube is realized through a glass aluminizing process.

9. A unit as claimed in claim 1 wherein said means for transforming the signal $I_a$ comprises four summing circuits the output signals of which $Out_0$, $Out_1$, $Out_2$ and $Out_3$ are obtained as:

$$Out_i = K \cdot (I_a - 50 \cdot i)$$

with $0 \leq i \leq 3$
where $I_a$ = current drawn by the ion pump;
where K = 5 V/60 nA.

10. A unit as claimed in claim 1 wherein said evaluating means, said selection means, said calculating means, said processing stage, said stage of timed threshold current raising, said measurement and comparison stage and said check-trigger stage are implemented through one 8 bit microprocessor which is further adapted to receive control instructions from a keyboard input unit and to apply coded signals containing information for the operator to a display unit.

11. A unit as claimed in claim 9 wherein said selecting means alternatively actuates four modules for evaluating the current value in accordance with the following conditions:

if $Out_0 < 0$ V there is selected the first module providing the evaluation $I_o = 0$;

if $Out_3 > 5$ V, there is selected the fourth module providing as an evaluation of the current value $I_a$ the value $I_e$ in accordance with the quantization of the 8 bit microprocessor;

if $0 \text{ V} < out_1 < 5 \text{ V}$ and at the same time $0 \text{ V} < Out_{i+1} < 5 \text{ V}$ with $0 \leq i \leq 3$, there is selected the second evaluation module that carries out the operation:

$$I_o = \frac{1}{2} \sum_{j=i}^{i+1} \left( \frac{OUT_j}{K} + 50 \cdot j \right)$$

where K = 5 V/60 nA;

if $0.42 \text{ V} < out_1 < 4.58 \text{ V}$, there is selected the third measuring module that carries out the operation:

$$I_o = (Out_1/K + 50 \cdot i)$$

where K = 5 V/60 nA.

12. A unit as claimed in claim 1 wherein said measurement and comparison stage comprises a phase inhibiting the working of the sampling pump and the simultaneous measurement of the power $P_0$ drawn by the ion pump, a phase activating the sampling pump with simultaneous measurement of the power $P_1$ drawn by the ion pump, and a phase comparing the two values $P_0$ and $P_1$, and in that the signal from said measuring stage takes a first value when $P_1 > P_0$ and a second value when $P_1 \leq P_0$.

13. A unit as claimed in claim 1 wherein said check-trigger stage provides a pre-starting phase in which a 10 seconds signal maintains the threshold of maximum current to the value of 1 μA, switches the ion pump feeding to the 6,000 V feeding voltage and energizes the filament heating.

14. A unit as claimed in claim 13 wherein said check-trigger stage causes the start of a working cycle only when the current drawn by the ion pump, evaluated after said pre-starting phase, is above 5 nA.

15. A unit as claimed in claim 14 wherein said check-trigger stage provides for a second check phase for actuating the unit working cycle only when the current drawn by the ion pump, evaluated after said pre-starting phase, is not higher than the current drawn by the ion pump during said second check phase in which the heating of the filament is cut off, said second check phase lasting for at least 4 seconds.

16. A unit as claimed in claim 1 wherein it is provided with a high voltage feeding device for the ion pump the voltage of which is switchable from 3,000 to 6,000 V, the former voltage being the steady state working voltage and the latter being the trigger voltage.

* * * * *